(12) United States Patent
Nagel et al.

(10) Patent No.: US 10,372,007 B1
(45) Date of Patent: Aug. 6, 2019

(54) ELECTROCHROMIC DEVICE DRIVER WITH A FAILSAFE MODULE AND METHOD OF USE

(71) Applicant: Kinestral Technologies, Inc., South San Francisco, CA (US)

(72) Inventors: Paul Nagel, South San Francisco, CA (US); Wally Barnum, South San Francisco, CA (US); Doug Brainard, South San Francisco, CA (US)

(73) Assignee: Kinestral Technologies, Inc., Hayward, CA (US)

( * ) Notice: Subject to any disclaimer, the term of this patent is extended or adjusted under 35 U.S.C. 154(b) by 49 days.

(21) Appl. No.: 15/820,891

(22) Filed: Nov. 22, 2017

Related U.S. Application Data

(60) Provisional application No. 62/511,270, filed on May 25, 2017, provisional application No. 62/426,132, filed on Nov. 23, 2016.

(51) Int. Cl.
*G02F 1/163* (2006.01)
*H02J 4/00* (2006.01)
*H02J 7/00* (2006.01)

(52) U.S. Cl.
CPC ............... *G02F 1/163* (2013.01); *H02J 4/00* (2013.01); *H02J 7/0068* (2013.01)

(58) Field of Classification Search
CPC ............ G02F 1/163; H02J 4/00; H02J 7/0068
See application file for complete search history.

(56) References Cited

U.S. PATENT DOCUMENTS

2007/0285759 A1* 12/2007 Ash .............................. B60J 3/04
359/275

* cited by examiner

*Primary Examiner* — Joseph P Martinez
(74) *Attorney, Agent, or Firm* — Womble Bond Dickinson (US) LLP

(57) ABSTRACT

A dual rail driver for an electrochromic device is provided. The dual rail driver includes a power supply having a first power supply rail and a second power supply rail and an H bridge connected to the first power supply rail and the second power supply rail and configurable to couple to an electrochromic device. The dual rail driver includes a controller coupled to the H bridge through a failsafe module and configurable to control switches of the H bridge to charge and discharge the electrochromic device from the first power supply rail and the second power supply rail. The failsafe module is configurable to override one or more signals from the controller that controls the switches of the H bridge through the failsafe module, responsive to detecting anomaly of the electrochromic device.

20 Claims, 5 Drawing Sheets

Single Rail Fail Safe

H Bridge Fail Safe

Dual Rail Fail Safe

ELECTROCHROMIC DEVICE DRIVER WITH A FAILSAFE MODULE AND METHOD OF USE

BACKGROUND

Electrochromic devices, as used in electrochromic windows and smart windows, typically have an anode and a cathode, one of which is driven by a power supply controlled by a microcontroller or other circuitry. One problem encountered in real-world situations is that if the microcontroller or processor has a software-based failure (or a hardware-based failure), the power supply continues to drive the electrochromic device, which then fails. This can cascade and cause power transistors to fail, circuit boards or wiring to fail, or even start a fire. Another problem encountered in real-world situations is that driving the anode or the cathode to a limited voltage or current level for tinting the electrochromic device, and connecting this same terminal to ground or to the opposite terminal for bleaching the electrochromic device, can result in uneven switching times, and also slow switching times. It is within this context that the embodiments arise.

SUMMARY

In some embodiments, a dual rail driver for an electrochromic device is provided. The dual rail driver includes a power supply having a first power supply rail and a second power supply rail and an H bridge connected to the first power supply rail and the second power supply rail and configurable to couple to an electrochromic device. The dual rail driver includes a controller coupled to the H bridge through a failsafe module and configurable to control switches of the H bridge to charge and discharge the electrochromic device from the first power supply rail and the second power supply rail. The failsafe module is configurable to override one or more signals from the controller that controls the switches of the H bridge through the failsafe module, responsive to detecting anomaly of the electrochromic device.

In some embodiments, a dual rail driver for an electrochromic device is provided. The driver includes a first regulator circuit configurable to couple a positive rail to a first terminal of an electrochromic device and to produce, from a first power source, a positive voltage on the positive rail. The driver includes a second regulator circuit configurable to couple a negative rail to the first terminal of the electrochromic device and to produce, from a second power source, a negative voltage on the negative rail. The driver includes a controller configurable to receive feedback from the first regulator circuit, the second regulator circuit and the electrochromic device and to control the first regulator circuit and the second regulator circuit, to tint and bleach the electrochromic device based on the feedback.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
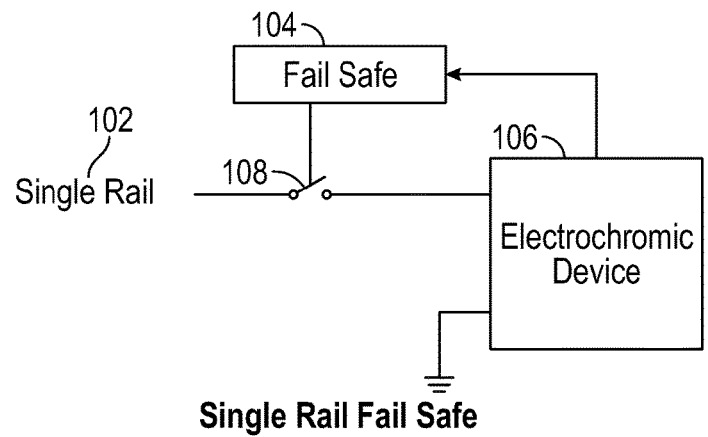
FIG. 1 is a block diagram of a single rail, failsafe driver for an electrochromic device.

FIG. 1 is a block diagram of a single rail, failsafe driver for an electrochromic device 106. The electrochromic device 106 has one terminal, which could be the anode or the cathode, grounded, and the other terminal connected to a single rail 102 power supply by a switch 108. The switch 108 is operated by a failsafe circuit 104, which has as input one or more signal or sensing lines with voltages or currents, or parameters based thereupon, from the electrochromic device 106. The single rail power supply voltage could be controlled by a controller (not shown), and the failsafe 302 can override the connection of the single rail 102 to the electrochromic device 106, by opening the switch 108 in response to one or more out of range levels, parameters or values from the electrochromic device. An optoisolator, a relay, one or more transistors of various types, etc., could be used for the switch 108.

Figure 2:
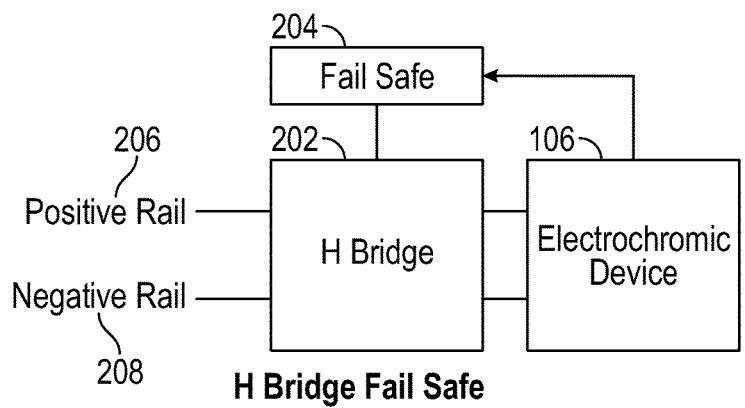
FIG. 2 is a block diagram of an H bridge, failsafe driver for an electrochromic device.

FIG. 2 is a block diagram of an H bridge, failsafe driver for an electrochromic device 106. A positive rail 206, from a positive voltage output power supply, and a negative rail 208, from a negative voltage output power supply, are inputs to an H bridge 202. The H bridge 202 could be made from multiple switches of various types in various configurations known in the art. Outputs of the H bridge 202 are connected to the electrochromic device 106, specifically to the anode and cathode of the electrochromic device. As with the failsafe circuit 104 in the single rail embodiment, the failsafe circuit 204 for the H bridge 202 has inputs from the electrochromic device 106 and can open switches in the H bridge 202 to disconnect the electrochromic device from receiving voltage and current. Alternatively, the H bridge 202 could be operated entirely by a controller, and switches external to the H bridge 202 could be operated by the failsafe circuit 204. The use of dual rails, i.e., the positive rail 206 and the negative rail 208, allows for faster discharging of the electrochromic device 106 than in the single rail case shown in FIG. 1, since a negative voltage can be applied. This will discharge the electrochromic device 106 more rapidly than connecting the two terminals of the electrochromic device 106 to each other or to ground.

Figure 3:
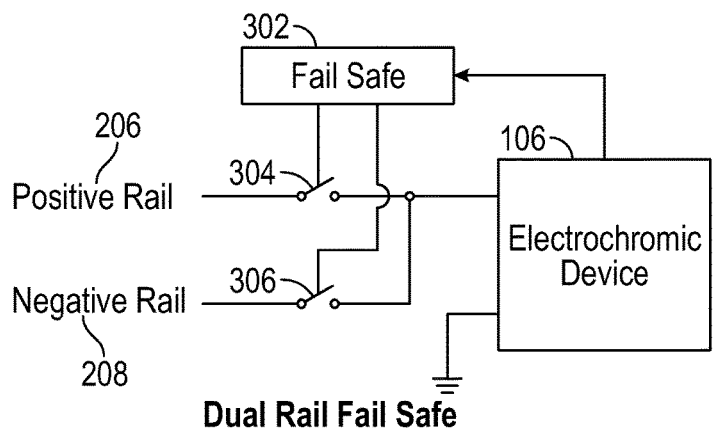
FIG. 3 is a block diagram of a dual rail, failsafe driver for an electrochromic device.

FIG. 3 is a block diagram of a dual rail, failsafe driver for an electrochromic device 106. Similar to the H bridge circuit shown in FIG. 2, the dual rail circuit has a positive rail 206, from a positive output voltage power supply, and a negative rail 208, from a negative output voltage power supply. This gives similar advantages as to discharging of the electrochromic device (bleaching), as an improvement over the single rail circuit of FIG. 1 (e.g., with failsafe 104) and other single rail circuits without failsafe. Also, the switch circuitry is simpler, and has fewer parts and simpler control than an H bridge 202, which typically has four single pole single throw switches, two double throw switches or a double pole double throw switch which would need a center, no connection position or control. Moreover, with fewer switches, the reliability is improved and the parasitic losses are decreased. The failsafe circuit 302 is connected to the switches 304, 306 so as to open whichever switches disconnect the electrochromic device 106 from receiving power, in response to detecting out of range operation of the electrochromic device 106. Power supplies for producing the positive rail 206 and the negative rail 208 could be of various design types and separate or integrated as a single unit.

Figure 4A:
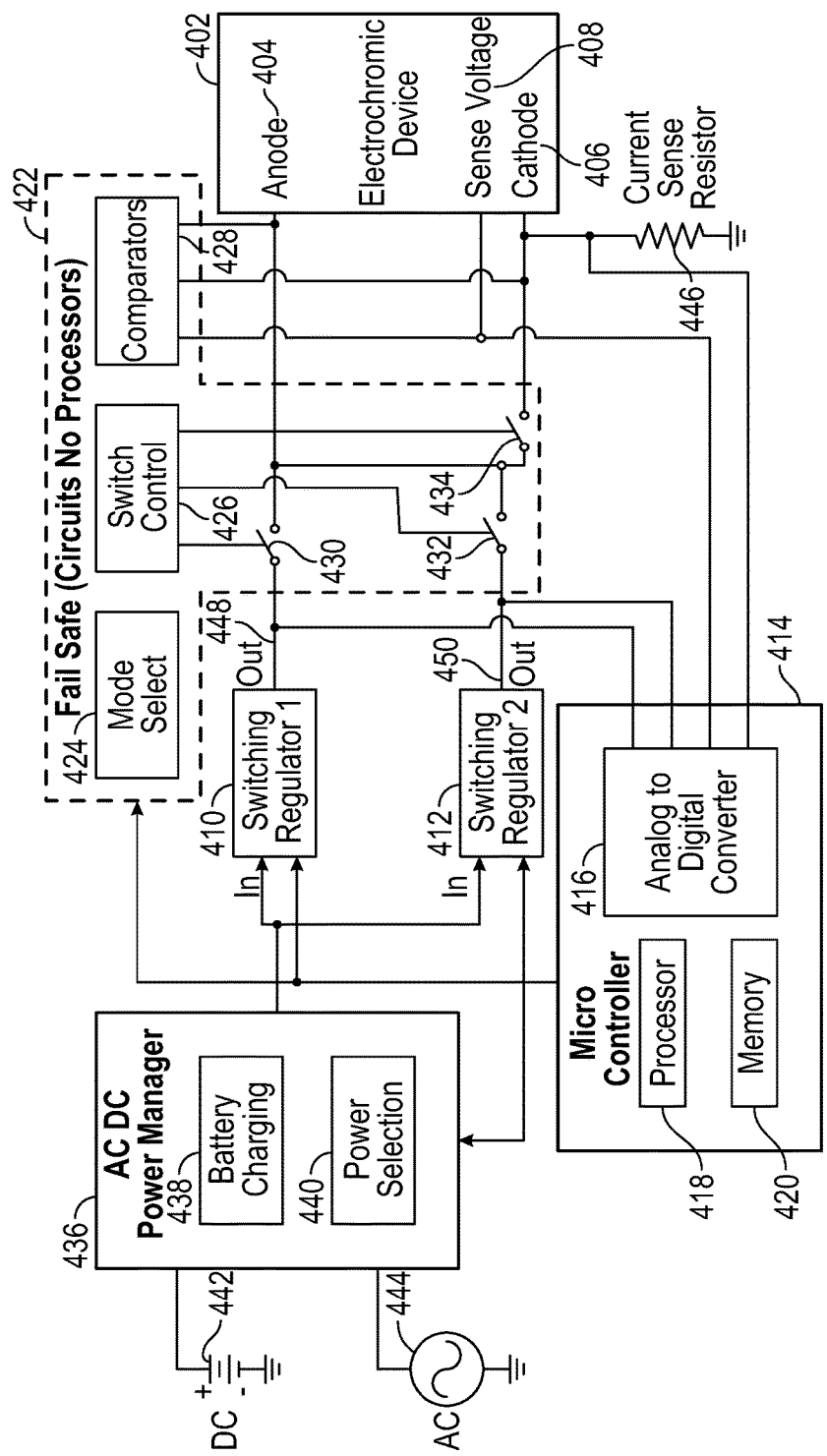
FIG. 4A is a block diagram showing details of a dual rail driver for an electrochromic device, with dual switching regulators, AC and DC power manager, and a failsafe circuit with mode selection and switch control.

FIG. 4A is a block diagram showing details of a dual rail driver for an electrochromic device 402, with dual switching regulators 410, 412, AC and DC power manager 436, and a failsafe circuit 422 with mode selection 424 and switch control 426. In this embodiment, the electrochromic device 402 has a cathode 406 that is grounded through a current sense resistor 446, and an anode 404 that can be driven with a positive voltage and current as supplied by the first switching regulator 410, and can be driven by a negative voltage and current as supplied by the second switching regulator 412. Variations are contemplated, in which the anode 404 is grounded and the cathode 406 is driven, or both the anode 404 and cathode 406 can be driven to charge (e.g., tint) and discharge (e.g., bleach) the electrochromic device 402. This embodiment has a sense voltage 408 terminal for the electrochromic device 402, although versions without the sense voltage 408 terminal are possible. A further version of an electrochromic device 402 has a sequestration terminal, which can be driven (e.g., through another switch, from one of the switching regulators or another switching regulator in further embodiments) to sequester charge in the electrochromic device 402. Still further versions of electrochromic devices 402 could be used, such as series and/or parallel combinations or arrangements of the electrochromic devices 402, for example to make multipanel electrochromic devices or compose a larger electrochromic device from multiple, smaller electrochromic devices.

The dual rail driver has two switching regulators 410, 412, and switches 430, 432 to connect one or the other of the switching regulators 410, 412 to the driven terminal, in this case the anode 404 of the electrochromic device 402. By using two switching regulators 410, 412, the first producing a positive voltage rail 448 and the second producing a negative voltage rail 450, the system has more efficient voltage and current generation and each of these can be tailored to different specifications for charging and discharging the electrochromic device 402. In one embodiment, the electrochromic device 402 is tinted by driving the anode 404, from the first switching regulator 410, to a constant voltage until the sense voltage 408 reaches a threshold, then driving a variable voltage or current to the anode 404 so as to maintain the sense voltage 408 at a constant, threshold level. Once the desired tinting level is reached, the switches 430, 432 are opened, drive from the positive voltage rail 448 is stopped, and the anode 404 terminal is allowed to float. The electrochromic device 402 is bleached by driving the anode 404, from the second switching regulator 412, to an opposite polarity voltage and current, until the sense voltage 408 reaches a negative threshold, then driving a variable voltage or current (again of opposite polarity to that of tinting) so as to maintain the sense voltage 408 at a constant, negative threshold. Once the discharge is complete or a desired tinting level is reached, the switch 432 is opened, drive from the negative voltage rail 450 is stopped, and the anode 404 is allowed to float. Drive levels and thresholds can be tailored for rapid, efficient tinting and bleaching of the electrochromic device 402, for example at drive voltage and current levels greater than in systems that lack the sense voltage terminal, resulting in more rapid tinting and bleaching.

An AC and DC power manager 436 has a power selection module 440 that selects between AC power 444 and DC power (e.g., from a battery 442) for supply to the switching regulators 410, 412, and also manages battery charging 438 and discharging for DC power. A microcontroller 414, with processor 418, memory 420 and analog-to-digital converter 416, controls the AC and DC power manager 436 and the switching regulators 410, 412, and provides input to the failsafe circuit/module 422 for control of the switches 430, 432, 434. Various voltages and/or currents from the electrochromic device 402 or sensors associated with the electrochromic device 402 (e.g., the current sense resistor 446) are connected as inputs to the analog-to-digital converter 416. The microcontroller monitors these voltages and/or currents as feedback from the switching regulators 410, 412 and the electrochromic device 402, and makes decisions about power selection and operation of the switching regulators 410, 412 and the switches 430, 432, 434, to charge, discharge or float the electrochromic device 402, or cease operations if any of the monitored voltages or currents is anomalous. However, the microcontroller 414, being operated by software or firmware, might experience a software or hardware failure of temporary or permanent nature.

The failsafe module 422, which is distinct from the microcontroller 414, monitors the voltages and/or currents from the electrochromic device 402 or sensors associated with the electrochromic device 402. These voltages or currents are inputs to comparators 428 in the failsafe module. A mode select 424 in the failsafe module is user selectable for failsafe mode. For example, the mode select could be physical electromechanical switches that are manually settable, or could be a non-volatile memory writable by the user, with outputs to the switch control module 426. For first failsafe mode, in case of failure as determined by the failsafe module 422, the anode 404 and cathode 406 are disconnected from the switching regulators 410, 412 and allowed to float. For second failsafe mode, in case of failure as determined by the failsafe module 422, the anode 404 and cathode 406 are connected to each other and allowed to discharge the electrochromic device 402. The switch control module 426 receives input from the mode select module 424 and the comparators 428 output, and control signals from the microcontroller 414, and has outputs that operate the switches 430, 432, 434 that connect or disconnect the anode 404 and cathode 406 to the switching regulators 410, 412 or to each other (e.g., in case of failure, in the second failsafe mode). In some embodiments, the failsafe module 422 has only electronic circuits, and no processor. For example the failsafe module 422 could have various logic gates so that output from the comparators 428, if an out of range current or voltage is detected, override signals from the microcontroller 414 and set the switches 430, 432, 434 to open and disconnect the anode 404 from the first switching regulator 410 and disconnect the anode 404 from the second switching regulator 412 in case of failure, and close and connect the anode 404 and the cathode 406 to each other in the second failsafe mode in case of failure. Further embodiments of the failsafe module 422 and switches 430, 432, 434 are readily implemented for the failsafe 104, 204, 302 depicted in FIGS. 1-3. Further monitoring and failsafe functions are readily designed into the failsafe module 422, in keeping with the teachings herein.

Figure 4B:
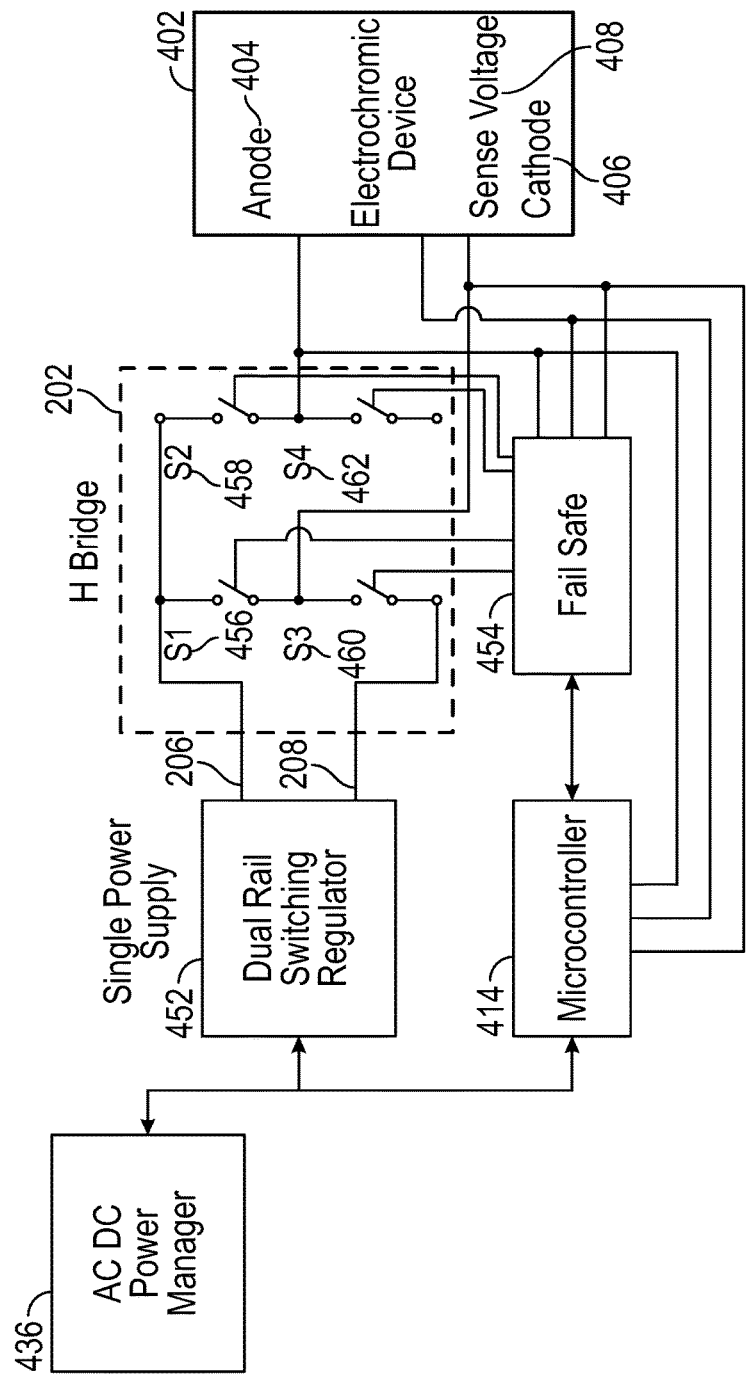
FIG. 4B is a block diagram of a single power supply, H bridge driver for an electrochromic device, with AC and DC power manager and a failsafe circuit.

FIG. 4B is a block diagram of a single power supply 452, H bridge 202 driver for an electrochromic device 402, with AC and DC power manager 436 and a failsafe circuit 454. Instead of the dual power supplies of FIG. 4A, implemented with two switching regulators 410, 412, the single power supply 452 in the embodiment in FIG. 4B could be more compact, have fewer parts and possibly greater reliability, and/or could be designed to supply greater current, voltage or both in comparison with each of the dual power supplies. In one embodiment, the single power supply 452 is a dual rail switching regulator, although other types of power supplies are readily devised. One of the power supply rails 206, 208 could be ground, and the other of the power supply rails 206, 208 could be at a positive voltage or a negative voltage, or both the power supply rails 206, 208 could be floating relative to ground, in various embodiments. The positive rail 206 and the negative rail 208 of the single power supply 452 are connected to opposed terminals of the H bridge 202, e.g., upper and lower terminals in the orientation of the H bridge 202 shown in FIG. 4B. Switches 456, 458, 460, 462 of the H bridge 202 couple the two rails 206, 208 to the electrochromic device 402, e.g., to the anode 404 and cathode 406. The switches 456, 458, 460, 462 can also be used to electrically short the anode 404 and cathode 406 to each other for example in some failsafe mode, or, when open, to isolate the anode 404 and cathode 406 of the electrochromic device 402 from the single power supply 452 altogether.

An H bridge 202 has multiple advantages in circuitry for controlling electrochromic device(s) 402 in some embodiments. The switches 456, 458, 460, 462 perform double duty, and are used to connect the rails 206, 208 of the single power supply 452 to the electrochromic device 402 in one polarity for charging or tinting, and the opposite polarity for discharging or bleaching the electrochromic device 402. In addition, the switches 456, 458, 460, 462 can also be used to float the electrochromic device 402, or short out the electrochromic device 402, without needing extra switches or relays to disconnect the power supply from the electrochromic device 402 or short the anode 404 and cathode 406 to each other. It should be appreciated that this keeps the number of parts required for the device to a minimum. As described above, the H bridge 202 allows each of the rails 206, 208 of the single power supply 402 to connect to either the anode 404 or the cathode 406 of the electrochromic device 402, removing the need for having two power supplies or a power supply with switchable polarity. The power supply can thus be simpler, and possibly more robust or of larger current or voltage drive than would be possible with the parts count or footprint of other power supply possibilities. Switches 456, 458, 460, 462 could be implemented with various solid-state devices such as transistors, including bipolar, MOSFET (metal oxide semiconductor field effect transistor), JFET (junction field effect transistor) and other FETs, triacs, etc., or relays.

Similar to the embodiment in FIG. 4A, the manager 436 in FIG. 4B selects between AC power 444 and DC power from the battery 442 (see FIG. 4A), in this embodiment for supplying the single power supply 452, the microcontroller 414, and other circuitry, and manages battery charging and discharging. The microcontroller 414 has related duties in the embodiment shown in FIG. 4B comparable to the duties for the embodiment in FIG. 4A, including making decisions about power selection and operation of the single power supply 452 and the switches 456, 458, 460, 462 of the H bridge 202, to charge, discharge or float the electrochromic device 402, or cease operations if any of the monitored voltages or currents is anomalous.

Also similar to the embodiment in FIG. 4A, the failsafe module 454 in FIG. 4B monitors the anode 404, sense voltage 408, cathode 406 of the electrochromic device 402, e.g., for voltages and/or currents, and overrides controls from the microcontroller 414 to operate the switches 456, 458, 460, 462 of the H bridge 202 in case of failure detected by the failsafe module 454. The failsafe module 454 could have a mode selection 424, switch control 426 and comparators 428 related to those of the failsafe module 422 of FIG. 4A, or other circuitry readily devised to perform various functions of failsafe operation as described herein. In some embodiments, there is no processor, only analog and digital circuitry in the failsafe module 454, for example logic and sensing circuitry.

In various operating scenarios, the microcontroller 414 selects AC or DC power from the AC and DC power manager 436 to source the single power supply 452, and sends signals to the failsafe module 454 to close the switches 462, 456 labeled "S4" and "S1" and connect the positive rail 206 of the single power supply 452 to the cathode 406 and the negative rail 208 of the single power supply 452 to the anode 404. The failsafe 454 does not exercise the override, and the microcontroller 414 has control of the switches of the H bridge 202. When the electrochromic device 402 reaches the desired tinting or transmissivity level, the microcontroller 414 directs the switches 456, 458, 460, 462 of the H bridge 202 to open. At another time, the microcontroller 414 directs the failsafe module 454 to close the switches 458, 460 labeled "S2" and "S3" and connect the positive rail 206 of the single power supply 452 to the anode 404 and the negative rail 208 of the single power supply 452 to the cathode 406 of the electrochromic device 402.

At a later time, the failsafe module 454 detects an anomalous voltage or current in the anode 404, sense voltage 408 or cathode 406, and overrides signals from the microcontroller 414 to open all of the switches 456, 458, 460, 462 of the H bridge 202. Alternatively, depending on design or the mode selected for the failsafe module 454, the failsafe module 454 could override signals from the microcontroller 414 to close the switches 456, 458 labeled "S1" and "S2" and electrically short the anode 404 and the cathode 406 to each other, or close the switches 460, 462 labeled "S3" and "S4" to accomplish the same. In a further embodiment, the failsafe module 454 could override signals from the microcontroller 414 to open the switches 458, 462 labeled "S2" and "S4" and disconnect the anode 404 of the electrochromic device 402 from the single power supply 452, or open the switches 456, 460 labeled "S1" and "S3" to disconnect the cathode 406 of the electrochromic device 402 from the single power supply 452. At no time, by design, should the failsafe 454 allow the switches 456, 460 labeled "S1" and "S3" to be closed at the same time, as this would short out the positive rail 206 and negative rail 208 of the single power supply 452. Likewise, the failsafe 454 should not allow the switches 458, 462 labeled "S2" and "S4" to be closed at the same time, as this would also short out the positive rail 206 and negative rail 208 of the single power supply 452. A possible exception to this feature is when both AC and DC power are decoupled from the single power supply 452, and it is desired to shut down and short out the single power supply 452 as well as short the anode 404 and cathode 406 to each other, for example during some sort of emergency shutdown of the system. Logic for these various scenarios, modes, overrides and desired operation and polarity of the switches in the H bridge 202 is implementation specific and readily devised in keeping with the teachings herein.

Figure 5A:
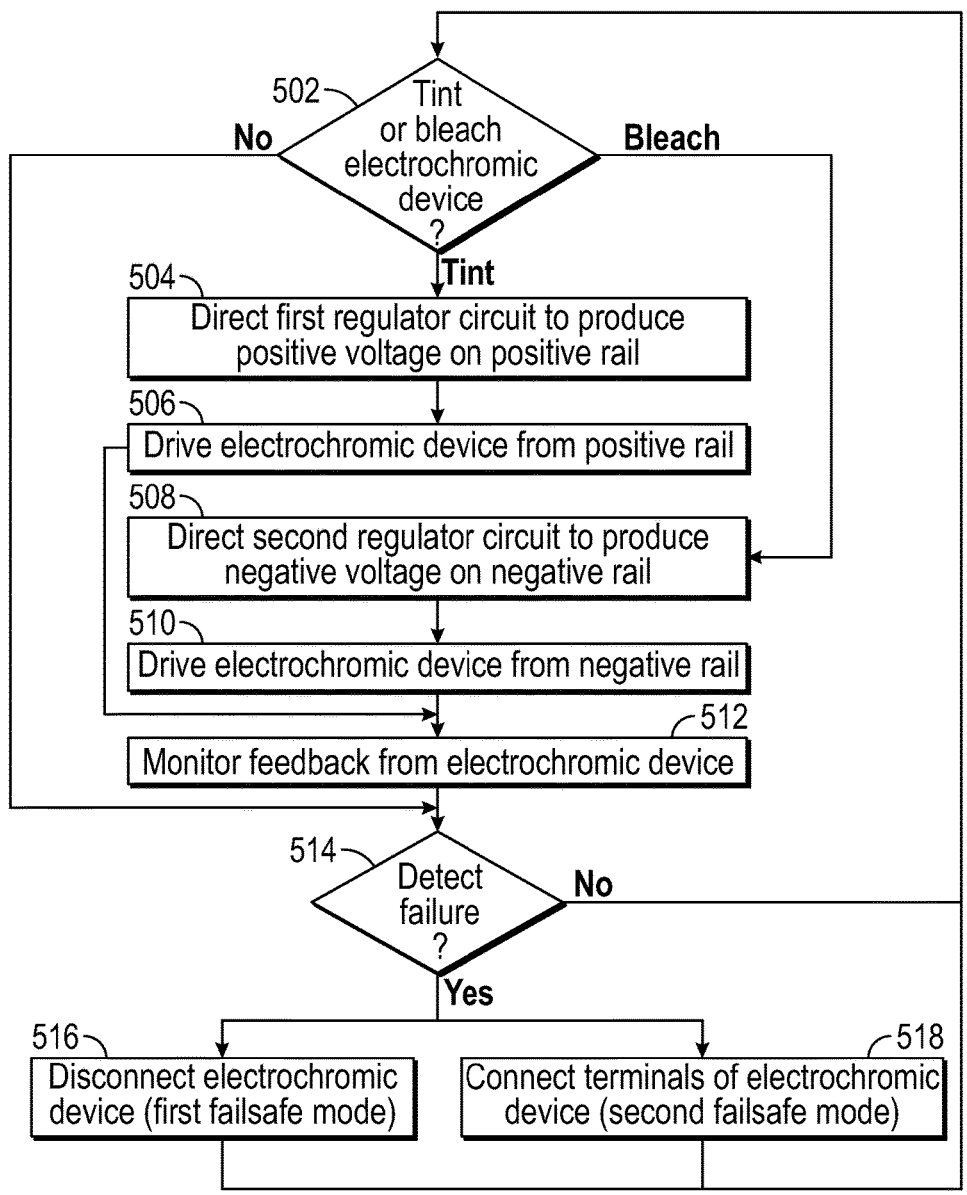
FIG. 5A is a flow diagram of a method for supplying dual rail power to an electrochromic device, which can be performed by embodiments of the dual rail driver.

FIG. 5A is a flow diagram of a method for supplying dual rail power to an electrochromic device, which can be performed by embodiments of the dual rail driver. Embodiments of a dual rail driver shown in FIGS. 3 and 4A are suitable for performing this method. In a decision action 502, it is determined whether to tint (i.e., charge) or bleach (i.e., discharge) an electrochromic device. If there is no present decision to tint or bleach the electrochromic device, and the electrochromic device should remain at the present level of transmissivity, flow proceeds to the decision action 514. If there is a decision to bleach the electrochromic device, flow proceeds to the action 508. If there is a decision to tint the electrochromic device, flow proceeds to the action 504.

In the action 504, from the decision to tint the electrochromic device, the dual rail driver directs the first regulator circuit to produce positive voltage on the positive rail. For example, the controller in some embodiments could send pulse width modulation signals or frequency modulation signals, etc., to a first switching regulator to control output voltage and/or current in accordance with a control process. In an action 506, the electrochromic device is driven from the positive rail. Flow proceeds to the action 512.

In the action 508, from the decision to bleach the electrochromic device, the dual rail driver directs the second regulator circuit to produce negative voltage on the negative rail. For example, the controller in some embodiments could send pulse width modulation signals or frequency modulation signals, etc., to a second switching regulator to control output voltage and/or current in accordance with a control process. In an action 510, the electrochromic device is driven from the negative rail. Flow proceeds to the action 512.

In the action 512, feedback from the electrochromic device is monitored. For example, the controller could process various feedback signals through an analog-to-digital converter and compare to expected values. Also, in some embodiments a failsafe module could monitor feedback from the electrochromic device. In a decision action 514, it is determined whether a failure is detected. If no failure is detected, flow branches back to the decision action 512, to determine whether to tint or bleach the electrochromic device, or leave the transmissivity level of the electrochromic device as is. If failure is detected, flow proceeds to the action 516, to disconnect the electrochromic device from the first and second regulator circuits (e.g., disconnect from the positive and negative rails) and leave the terminals floating, for a first failsafe mode, or connect the terminals (e.g., anode and cathode) of the electrochromic device to each other, for a second failsafe mode.

Figure 5B:
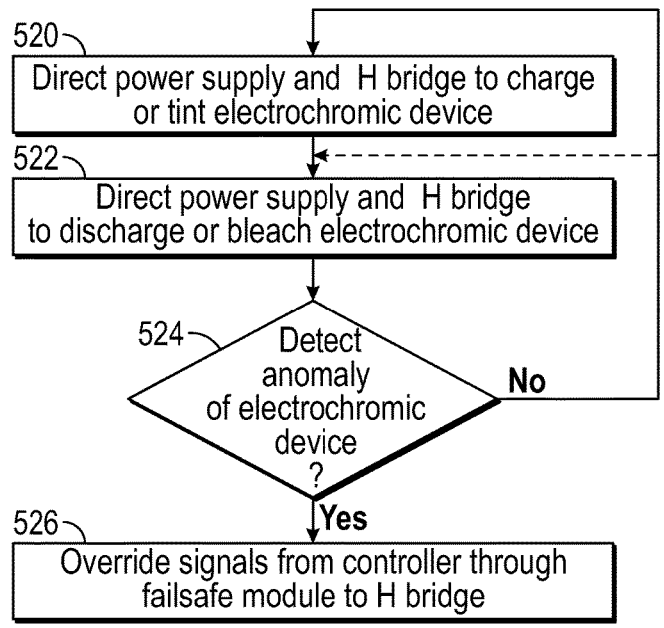
FIG. 5B is a flow diagram of a further method for supplying dual rail power to an electrochromic device, which can be performed by embodiments of the dual rail driver.

FIG. 5B is a flow diagram of a further method for supplying dual rail power to an electrochromic device, which can be performed by embodiments of the dual rail driver. Embodiments of a dual rail driver shown in FIG. 4B are suitable for performing this method. In an action 520, a power supply and H bridge are directed to charge or tint an electrochromic device. For example, a controller could direct the power supply and direct the H bridge through a failsafe module, as shown in FIG. 4B. In an action 522, the power supply and the H bridge are directed to discharge or bleach the electrochromic device. As above, this direction could occur from a controller through the power supply and through a failsafe module to the H bridge.

In a decision action 524, it is determined whether an anomaly of the electrochromic device is detected. If the answer is no, and no detection of an anomaly of the electrochromic device has occurred, flow branches back to the action 520, or optionally to the action 522, to continue operation of the electrochromic device by directing the power supply and the H bridge to charge or tint, or discharge or bleach the electrochromic device. If the answer is yes, an anomaly of the electrochromic device is detected, flow proceeds to the action 526. In the action 526, signals from the controller through the failsafe module to the H bridge are overridden. For example, the failsafe module overrides the signals from the controller, and the overriding takes place in circuitry in the failsafe module, with output of the overriding circuitry connected to the H bridge. Overriding could disconnect the positive rail and/or the negative rail of the power supply from the anode and/or the cathode of the electrochromic device, through operation of the switches of the H bridge. In some embodiments, the overriding could electrically short the anode and cathode of the electrochromic device together.

Figure 6:
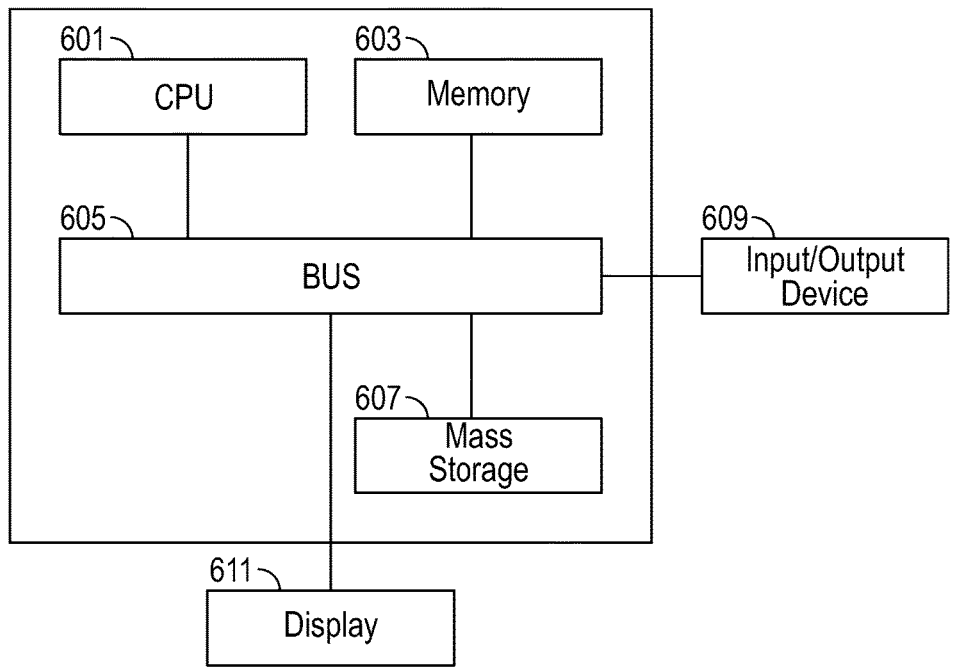
FIG. 6 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 6 is an illustration showing an exemplary computing device which may implement the embodiments described herein. The computing device of FIG. 6 may be used to perform embodiments of the functionality for controlling and managing power for an electrochromic device in accordance with some embodiments. The computing device includes a central processing unit (CPU) 601, which is coupled through a bus 605 to a memory 603, and mass storage device 607. Mass storage device 607 represents a persistent data storage device such as a floppy disc drive or a fixed disc drive, which may be local or remote in some embodiments. The mass storage device 607 could implement a backup storage, in some embodiments. Memory 603 may include read only memory, random access memory, etc. Applications resident on the computing device may be stored on or accessed via a computer readable medium such as memory 603 or mass storage device 607 in some embodiments. Applications may also be in the form of modulated electronic signals modulated accessed via a network modem or other network interface of the computing device. It should be appreciated that CPU 601 may be embodied in a general-purpose processor, a special purpose processor, or a specially programmed logic device in some embodiments.

Display 611 is in communication with CPU 601, memory 603, and mass storage device 607, through bus 605. Display 611 is configured to display any visualization tools or reports associated with the system described herein. Input/output device 609 is coupled to bus 605 in order to communicate information in command selections to CPU 601. It should be appreciated that data to and from external devices may be communicated through the input/output device 609. CPU 601 can be defined to execute the functionality described herein to enable the functionality described with reference to FIGS. 1-5. The code embodying this functionality may be stored within memory 603 or mass storage device 607 for execution by a processor such as CPU 601 in some embodiments. The operating system on the computing device may be MS DOS™, MS-WINDOWS™, OS/2™, UNIX™, LINUX™, or other known operating systems. It should be appreciated that the embodiments described herein may also be integrated with a virtualized computing system implemented with physical computing resources.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A dual rail driver for an electrochromic device, comprising:
    a power supply having a first power supply rail and a second power supply rail;
    an H bridge connected to the first power supply rail and the second power supply rail and configurable to couple to an electrochromic device;
    a controller coupled to the H bridge through a failsafe module and configurable to control switches of the H bridge to charge and discharge the electrochromic device from the first power supply rail and the second power supply rail; and
    the failsafe module, configurable to override one or more signals from the controller that controls the switches of the H bridge through the failsafe module, responsive to detecting anomaly of the electrochromic device.

2. The dual rail driver of claim 1, further comprising:
    the failsafe module comprising a failsafe circuit, distinct from the controller and configurable to connect each of the first and second power supply rails to the electrochromic device, and disconnect each of the first and second power supply rails from the electrochromic device, through the H bridge.

3. The dual rail driver of claim 1, further comprising:
    a power manager, configurable to select a power source for the power supply from among two or more power sources.

4. The dual rail driver of claim 1 wherein the power supply comprises a switching regulator.

5. The dual rail driver of claim 1, wherein the controller and the power supply are configurable, for charging the electrochromic device, to drive the electrochromic device with a first positive voltage until a sense voltage of a sense terminal of the electrochromic device reaches a threshold, then to drive the electrochromic device with a second variable positive voltage or current so as to maintain the sense voltage at a constant, threshold level until a tinting level of the electrochromic device is reached.

6. The dual rail driver of claim 1, wherein the controller and the power supply are configurable, for discharging the electrochromic device, to drive the electrochromic device with a first negative voltage until a sense voltage of a sense terminal of the electrochromic device reaches a negative voltage threshold, then to drive the electrochromic device with a second variable negative voltage or current so as to maintain the sense voltage at a constant, negative voltage threshold level until a tinting level of the electrochromic device is reached.

7. The dual rail driver of claim 1, further comprising:
    a power manager configurable to select between AC (alternating current) and DC (direct current) power for the power supply; and
    the power manager further configurable to charge a battery, for the DC power.

8. A dual rail driver for an electrochromic device, comprising:
    a single power supply having dual rails and configurable to produce a positive voltage on a positive rail and a negative voltage, relative to the positive rail, on a negative rail;
    a plurality of switches arranged as an H bridge to couple and decouple the positive rail and the negative rail to an electrochromic device;
    a controller configurable to control the single power supply and the plurality of switches based on feedback from the electrochromic device, to set or change transmissivity of the electrochromic device; and
    a failsafe module, coupled between the controller and the H bridge, and configurable to control the plurality of switches of the H bridge as an override of signals from the microcontroller in event of anomaly of the electrochromic device.

9. The dual rail driver of claim 8, further comprising:
    the failsafe module having no processor and comprising a failsafe circuit having one or more comparators coupled to the feedback; and
    the failsafe circuit having a switch control coupled to the one or more comparators and the plurality of switches and configurable to override the controller to decouple the positive rail or the negative rail from the electrochromic device, responsive to the feedback.

10. The dual rail driver of claim 8, further comprising:
    a power manager, configurable to manage battery charging of a battery and configurable to select between an AC (alternating current) source and the battery for a DC (direct current) source, to power the single power supply.

11. The dual rail driver of claim 8, wherein the controller is configurable to perform a method comprising:
    directing the single power supply and the plurality of switches to drive the electrochromic device with a first positive voltage, to charge the electrochromic device until a sense voltage of the electrochromic device reaches a threshold;

directing the single power supply and the plurality of switches to drive the electrochromic device with a second variable positive voltage or current to keep the sense voltage at a constant threshold level; and directing the single power supply and the plurality of switches to stop driving the electrochromic device when the electrochromic device reaches a level of transmissivity.

12. The dual rail driver of claim 8, wherein the controller is configurable to perform a method comprising:

directing the single power supply and the plurality of switches to drive the electrochromic device with a first negative voltage, to discharge the electrochromic device until a sense voltage of the electrochromic device reaches a negative voltage threshold;

directing the single power supply and the plurality of switches to drive the electrochromic device with a second variable negative voltage or current to keep the sense voltage at a constant threshold level; and directing the single power supply and the plurality of switches to stop driving the electrochromic device when the electrochromic device reaches a level of transmissivity.

13. The dual rail driver of claim 8, further comprising:

a failsafe circuit having a mode select configurable to disconnect the electrochromic device from the single power supply in a first failsafe mode and to connect a first terminal of the electrochromic device to a second terminal of the electrochromic device in a second failsafe mode.

14. A method for supplying dual rail power to an electrochromic device, performed by a dual rail driver, the method comprising:

directing a power supply and an H bridge, coupled to each other and coupled through a failsafe module to an electrochromic device, to charge the electrochromic device;

directing the power supply and the H bridge to discharge the electrochromic device; and overriding, in the failsafe module, signals from a controller that is directing the power supply and the H bridge through the failsafe module, responsive to the failsafe module detecting an anomaly of the electrochromic device.

15. The method of claim 14, wherein the overriding comprises:

controlling switches of the H bridge to disconnect the power supply from the electrochromic device.

16. The method of claim 14, wherein the overriding comprises:

controlling switches of the H bridge to connect a first terminal of the electrochromic device to a second terminal of the electrochromic device.

17. The method of claim 14, wherein the directing the power supply and the H bridge to charge the electrochromic device comprises:

driving the electrochromic device with a first positive voltage until a sense voltage of the electrochromic device reaches a threshold;

driving the electrochromic device with a second variable positive voltage or current to maintain the sense voltage at a constant level, responsive to the sense voltage reaching the threshold; and stopping the driving the electrochromic device when a tinting level of the electrochromic device is achieved.

18. The method of claim 14, wherein the directing the power supply and the H bridge to discharge the electrochromic device comprises:

driving the electrochromic device with a first negative voltage until a sense voltage of the electrochromic device reaches a negative voltage threshold;

driving the electrochromic device with a second variable negative voltage or current to maintain the sense voltage at a constant negative voltage level, responsive to the sense voltage reaching the negative voltage threshold; and stopping the driving the electrochromic device when a tinting level of the electrochromic device is achieved.

19. The method of claim 14, further comprising:

selecting between AC (alternating current) and DC (direct current) to power the power supply; and charging and discharging a battery for the DC to power the power supply.

20. The method of claim 14, further comprising:

evaluating feedback from the electrochromic device, in a controller, wherein the directing the power supply and the H bridge to charge and discharge the electrochromic device are based on the controller evaluating the feedback; and further evaluating the feedback from the electrochromic device, in the failsafe module, wherein the failsafe module is distinct from the controller and the overriding is based on the further evaluating the feedback.

* * * * *